US012430807B2

(12) United States Patent
Ramasubramonian et al.

(10) Patent No.: US 12,430,807 B2
(45) Date of Patent: *Sep. 30, 2025

(54) CLIPPING LASER INDICES IN PREDICTIVE GEOMETRY CODING FOR POINT CLOUD COMPRESSION

(71) Applicant: QUALCOMM Incorporated, San Diego, CA (US)

(72) Inventors: Adarsh Krishnan Ramasubramonian, Irvine, CA (US); Bappaditya Ray, San Diego, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,789

(22) Filed: May 29, 2024

(65) Prior Publication Data

US 2024/0312067 A1 Sep. 19, 2024

Related U.S. Application Data

(63) Continuation of application No. 17/491,114, filed on Sep. 30, 2021, now Pat. No. 12,033,360.
(Continued)

(51) Int. Cl.
*G06T 9/00* (2006.01)
*G01S 17/89* (2020.01)

(52) U.S. Cl.
CPC .............. *G06T 9/001* (2013.01); *G01S 17/89* (2013.01)

(58) Field of Classification Search
CPC ........... G06T 9/001; G06T 9/004; G06T 9/40; G06T 17/20; G06T 9/00;
(Continued)

(56) References Cited

U.S. PATENT DOCUMENTS 12,033,360 B2 * 7/2024 Ramasubramonian .....................
G01S 17/89
2019/0080483 A1 3/2019 Mammou et al.
(Continued)

OTHER PUBLICATIONS

"G-PCC Future Enhancements", 130, MPEG Meeting, Apr. 20, 2020-Apr. 24, 2020, ALPBACH, (Motion Picture Expert Group or ISO/IEC JTC1/SC29/WG11), No. n19328, Jul. 21, 2020, XP030289574, 140 Pages.
(Continued)

*Primary Examiner* — Jose L Couso
(74) *Attorney, Agent, or Firm* — Shumaker & Sieffert, P.A.

(57) ABSTRACT

A method of encoding a point cloud includes determining, by one or more processors, a quantity of lasers used to capture light detection and ranging (LIDAR) data that represents the point cloud; and encoding, by the one or more processors, a laser index for a current node of the point cloud, wherein encoding the laser index comprises: obtaining a predicted laser index value of the current node; determining a residual laser index value for the current node, wherein determining the residual laser index value comprises constraining a sum of the residual laser index value and the predicted laser index value to be less than or equal to the determined quantity of lasers minus one; and encoding, in a bitstream, one or more syntax elements that represent the residual laser index value.

15 Claims, 10 Drawing Sheets

Related U.S. Application Data

(60) Provisional application No. 63/088,843, filed on Oct. 7, 2020, provisional application No. 63/087,804, filed on Oct. 5, 2020.

(58) Field of Classification Search
CPC . G06T 2207/10028; G06T 2207/30252; G06T 7/521; G06T 7/55; G01S 17/89; G01S 7/4802; G01S 7/4808; G01S 13/42; G01S 7/003; G01S 2013/9316; G01S 17/931; G01S 2013/93271; G01S 7/4814; G01S 7/4815; G01S 7/4817; H04N 19/13; H04N 19/597; H04N 19/71; H04N 19/91; H04N 19/50; H04N 19/70; H04N 19/96; B60W 2420/52; G06V 20/56
See application file for complete search history.

(56) References Cited

U.S. PATENT DOCUMENTS

| | | |
|---|---|---|
| 2022/0224941 A1 | 7/2022 | Sugio et al. |
| 2022/0345731 A1 | 10/2022 | Sugio et al. |
| 2022/0358686 A1 | 11/2022 | Lasserre et al. |
| 2023/0005190 A1 | 1/2023 | Sugio et al. |
| 2023/0035807 A1 | 2/2023 | Sugio et al. |
| 2023/0118907 A1 | 4/2023 | Iguchi et al. |
| 2023/0123146 A1 | 4/2023 | Sugio et al. |
| 2023/0162405 A1 | 5/2023 | Sugio et al. |

OTHER PUBLICATIONS

International Search Report and Written Opinion—PCT/US2021/053099—ISA/EPO—Jan. 17, 2022.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Lasserre (Blackberry) S., et al., "[GPCC] [CE13.22 Related] On Decoupling Planar and IDCM in Angular Mode", 130. MPEG Meeting, Apr. 20, 2020-Apr. 24, 2020, Alpbach, (Motion Picture Expert Group or ISO/IEC JTC1/SC29/WG11), No. m52956, Mar. 3, 2020, XP030285275, XP030285276, 16 Pages.

Preda M., "3D GC Report from the 132 MPEG Meeting @ online (1st WG 7 meeting)", WG 7 Convenor's Report of the 1st Meeting, 133. MPEG Meeting, Jan. 11, 2021-Jan. 15, 2021, Online, (Motion Picture Expert Group or ISO/IEC JTC1/SC29/WG11), No. m55911, Dec. 31, 2020 (Dec. 31, 2020), XP030290734, 51 Pages.

Ramasubramonian (Qualcomm) A.K., et al., "[G-PCC][New proposal] Laser Index Clipping in Predictive Geometry", 132. MPEG Meeting, Oct. 12, 2020-Oct. 16, 2020, Online, (Motion Picture Expert Group or ISO/IEC JTC1/SC29/WG11), No. m55384, Oct. 7, 2020, XP030292906, 2 Pages.

Taiwan Search Report—TW110136688—TIPO—Apr. 7, 2025.

\* cited by examiner

CLIPPING LASER INDICES IN PREDICTIVE GEOMETRY CODING FOR POINT CLOUD COMPRESSION

This application is a continuation of U.S. patent application Ser. No. 17/491,114, filed 30 Sep. 2021, which claims the benefit of U.S. Provisional Application No. 63/087,804, filed Oct. 5, 2020, and U.S. Provisional Application No. 63/088,843, filed Oct. 7, 2020, the entire contents of each of which are incorporated by reference herein.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

Figure 1:
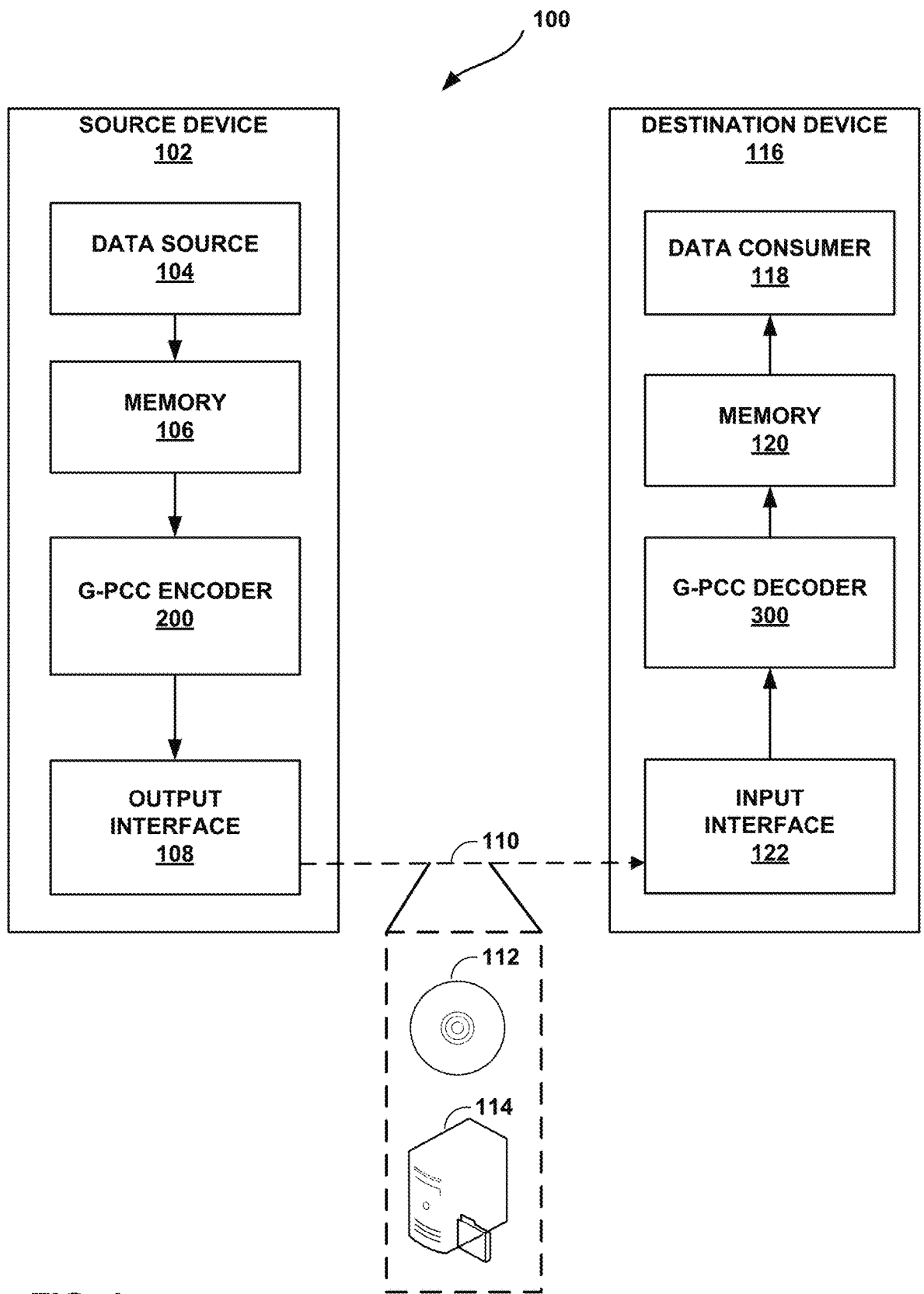
FIG. 1 is a block diagram illustrating an example encoding and decoding system that may perform the techniques of this disclosure.

In general, this disclosure describes techniques for coding nodes of a point cloud, such as for the Geometry Point Cloud Compression (G-PCC) standard currently being developed. However, the example techniques are not limited to the G-PCC standard. In some examples of G-PCC, coordinates of position of nodes (also referred to as points) of a point cloud may converted into a $(r, \phi, i)$ domain in which a position of a node is represented by three parameters, a radius r, an azimuth $\phi$, and a laser index i. When using an angular mode for predictive geometry coding in G-PCC, a G-PCC coder may perform prediction in the $(r, \phi, i)$ domain. For instance, the G-PCC coder may determine a predicted radius r, azimuth $\phi$, and laser index i of a node and add the predicted radius r, azimuth $\phi$, and laser index i of the node to residual data (e.g., a residual radius r, a residual azimuth $\phi$, and a residual laser index i) to determine a reconstructed radius r, azimuth $\phi$, and laser index i of the node. Due to errors in rounding and other sources, the reconstructed laser index i may exceed a valid range of laser indices (e.g., indicate a laser that does not exist). Such an outcome may result in undefined behaviour of a decoder, which may be undesirable.

In accordance with one or more techniques of this disclosure, a G-PCC coder may constrain a value of the reconstructed laser index to be within a valid range of laser indices. For instance, responsive to determining that a laser index of a particular node will be reconstructed outside the valid range of laser indices, a G-PCC encoder may adjust encoding of the laser index of the particular node such that the laser index will be reconstructed within the valid range (e.g., reduce the value of the residual laser index). Additionally or alternatively, a G-PCC decoder may clip values of reconstructed laser indices to be within the valid range. In this way, the techniques of this disclosure may enable a G-PCC coder to avoid undesirable undefined behaviour.

In one example, a method of encoding a point cloud includes determining, by one or more processors, a quantity of lasers used to capture light detection and ranging (LIDAR) data that represents the point cloud; and encoding, by the one or more processors, a laser index for a current node of the point cloud, wherein encoding the laser index comprises: obtaining a predicted laser index value of the current node; determining a residual laser index value for the current node, wherein determining the residual laser index value comprises constraining a sum of the residual laser index value and the predicted laser index value to be less than or equal to the determined quantity of lasers minus one; and encoding, in a bitstream, one or more syntax elements that represent the residual laser index value.

In another example, a method of decoding a point cloud includes determining, by one or more processors, a quantity of lasers used to capture LIDAR data that represents the point cloud; and decoding, by the one or more processors, a laser index for a current node of the point cloud, wherein decoding the laser index comprises: obtaining a predicted laser index value of the current node; decoding, from a bitstream, one or more syntax elements that represent a residual laser index value for the current node; and reconstructing, as a sum of the residual laser index value and the predicted laser index value, the laser index of the current node, wherein the laser index of the current node is constrained to be less than or equal to the determined quantity of lasers minus one.

In another example, a device for encoding a point cloud includes a memory configured to store at least a portion of the point cloud; and one or more processors implemented in circuitry and configured to: determine a quantity of lasers used to capture LIDAR data that represents the point cloud; and encode a laser index for a current node of the point cloud, wherein, to encode the laser index, the one or more processors are configured to: obtain a predicted laser index value of the current node; determine a residual laser index value for the current node, wherein, to determine the residual laser index value, the one or more processors are configured to constrain a sum of the residual laser index value and the predicted laser index value to be less than or equal to the determined quantity of lasers minus one; and encode, in a bitstream, one or more syntax elements that represent the residual laser index value.

In another example, a device for decoding a point cloud includes a memory configured to store at least a portion of the point cloud; and one or more processors implemented in circuitry and configured to: determine a quantity of lasers used to capture LIDAR data that represents the point cloud; and decode a laser index for a current node of the point cloud, wherein, to decode the laser index, the one or more processors are configured to: obtain a predicted laser index value of the current node; decode, from a bitstream, one or more syntax elements that represent a residual laser index value for the current node; and reconstruct, as a sum of the residual laser index value and the predicted laser index value, the laser index of the current node, wherein the laser index of the current node is constrained to be less than or equal to the determined quantity of lasers minus one.

In another example, a computer-readable storage medium stores instructions that, when executed by one or more processors, cause the one or more processors to: determine a quantity of lasers used to capture LIDAR data that represents the point cloud; and encode a laser index for a current node of the point cloud, wherein the instructions that cause the one or more processors to encode the laser index comprise instructions that cause the one or more processors to: obtain a predicted laser index value of the current node; determine a residual laser index value for the current node, wherein the instructions that cause the one or more processors to determine the residual laser index value comprise instructions that cause the one or more processors to constrain a sum of the residual laser index value and the predicted laser index value to be less than or equal to the determined quantity of lasers minus one; and encode, in a bitstream, one or more syntax elements that represent the residual laser index value In another example, a computer-readable storage medium stores instructions that, when executed by one or more processors, cause the one or more processors to: determine a quantity of lasers used to capture LIDAR data that represents the point cloud; and decode a laser index for a current node of the point cloud, wherein the instructions that cause the one or more processors to decode the laser index comprise instructions that cause the one or more processors to: obtain a predicted laser index value of the current node; decode, from a bitstream, one or more syntax elements that represent a residual laser index value for the current node; and reconstruct, as a sum of the residual laser index value and the predicted laser index value, the laser index of the current node, wherein the laser index of the current node is constrained to be less than or equal to the determined quantity of lasers minus one.

The details of one or more examples are set forth in the accompanying drawings and the description below. Other features, objects, and advantages will be apparent from the description, drawings, and claims.

DETAILED DESCRIPTION

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any combination of a wide range of devices, including desktop computers, notebook (i.e., laptop) computers, tablet computers, set-top boxes, telephone handsets such as smartphones, televisions, cameras, display devices, head mounted devices (HMDs), extended reality (XR) devices (e.g., virtual reality (VR) devices, mixed reality (MR) devices, and/or augmented reality (AR) devices), digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to clipping laser indices in predictive geometry coding. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to clipping laser indices in predictive geometry coding. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from a scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be used to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A draft of the G-PCC standard is available in G-PCC DIS, ISO/IEC JTC1/SC29/WG11 w19328, Brussels, Belgium, January 2020, and a description of the codec is available in G-PCC Codec Description v8, ISO/IEC JTC1/SC29/WG11 w19525, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
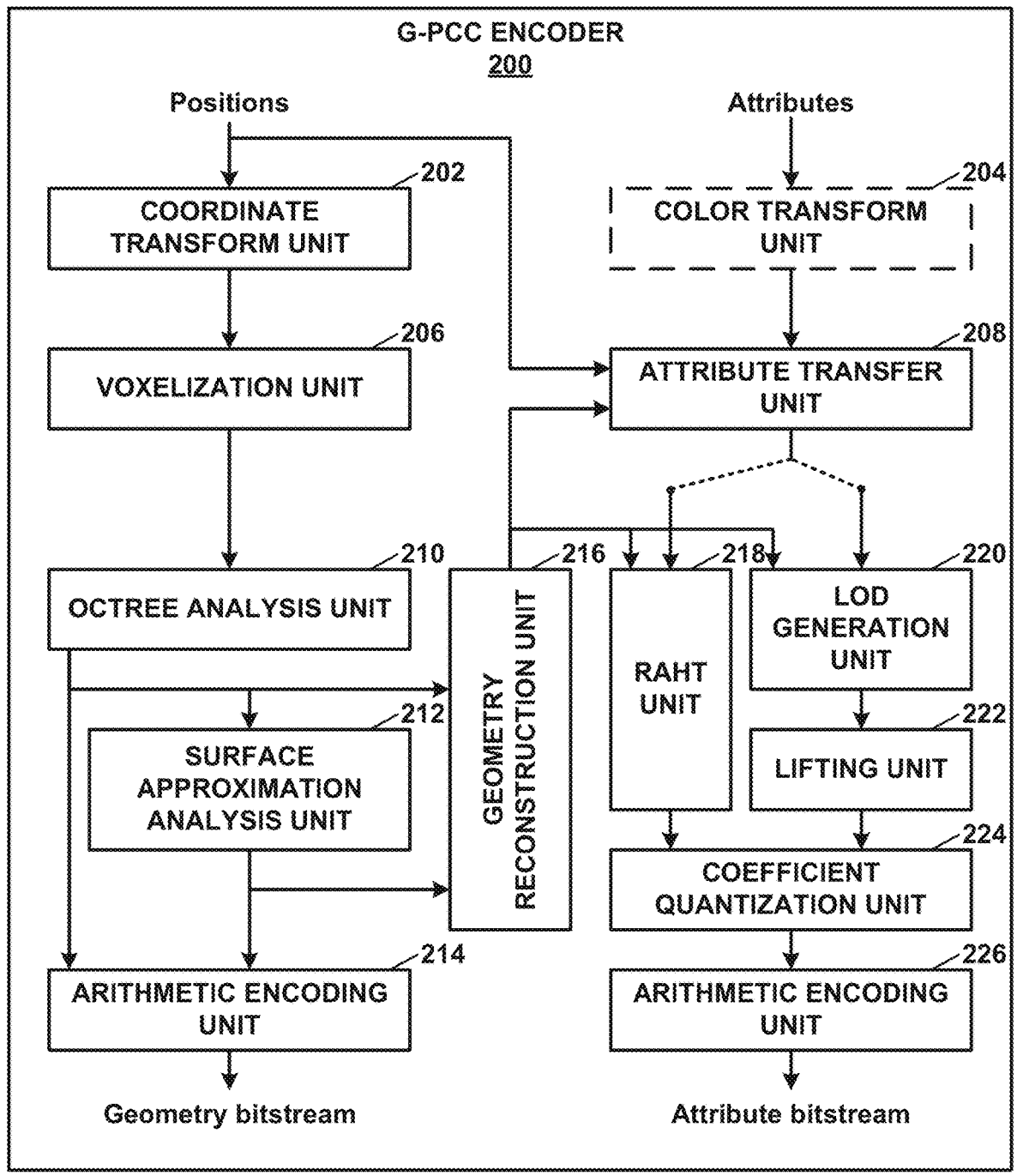
FIG. 2 is a block diagram illustrating an example Geometry Point Cloud Compression (G-PCC) encoder.
Figure 3:
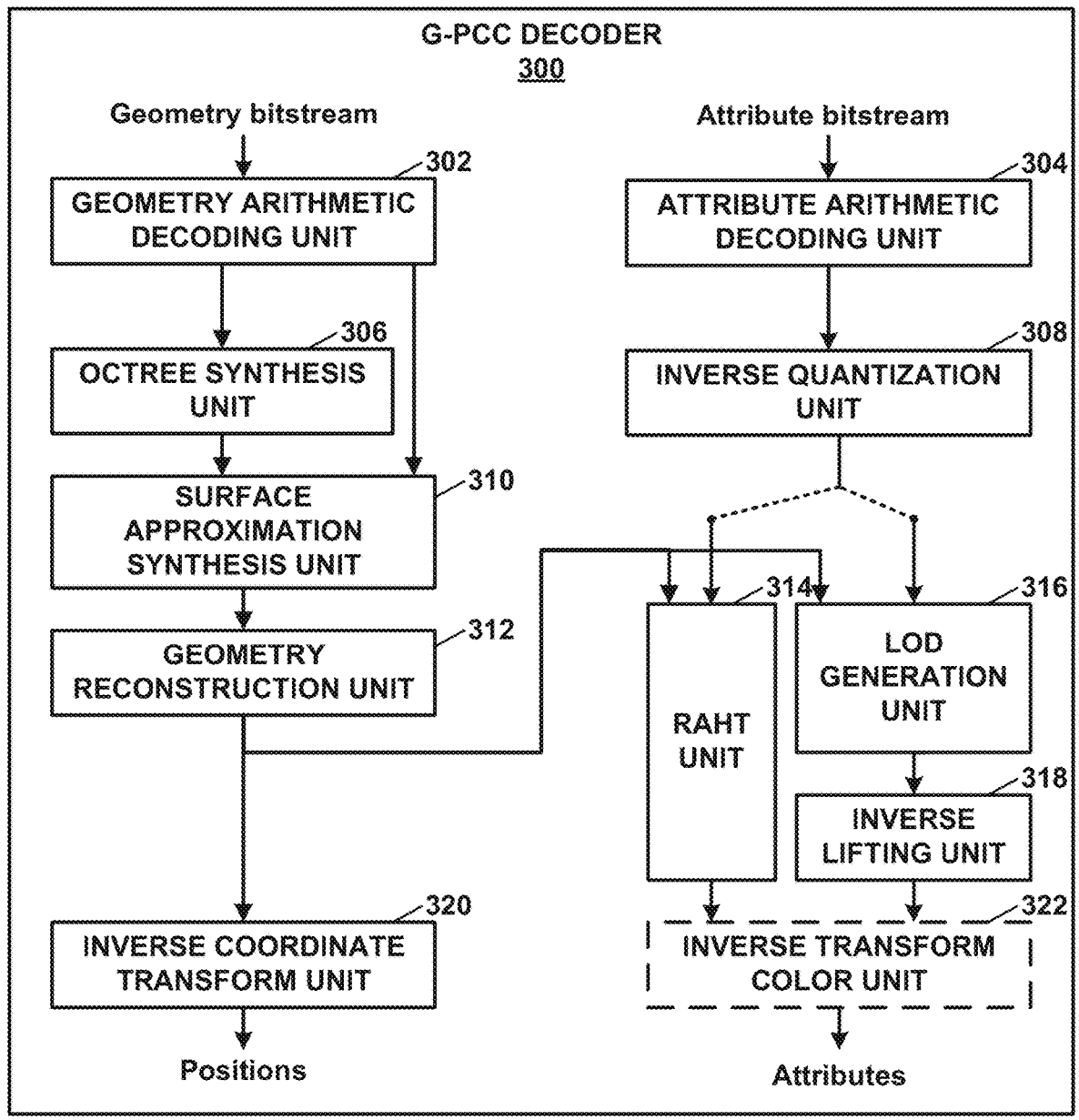
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, modules 212, 218, 310, and 314 are options typically used for Category 1 data. Modules 220, 222, 316, and 318 are options typically used for Category 3 data. All the other modules are common between Categories 1 and 3.

For Category 3 data, the compressed geometry is typically represented as an octrec from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octrec. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting Transform are typically used for Category 1 data, while Predicting Transform is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on a distance metric from the neighboring nodes or based on a sampling distance.

At G-PCC encoder 200, the residuals obtained as the output of the coding methods for the attributes are quantized (e.g., by one of arithmetic encoding units 214 and/or 226). The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud. As shown in FIG. 2, attribute transfer unit 208 may transfer the attributes to one or both of RAHT unit 218 and LOD generation unit 220.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304). As shown in FIG. 3, inverse quantization unit 308 may transfer the attribute values to one or both of RAHT unit 314 and LOD generation unit 316.

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 4:
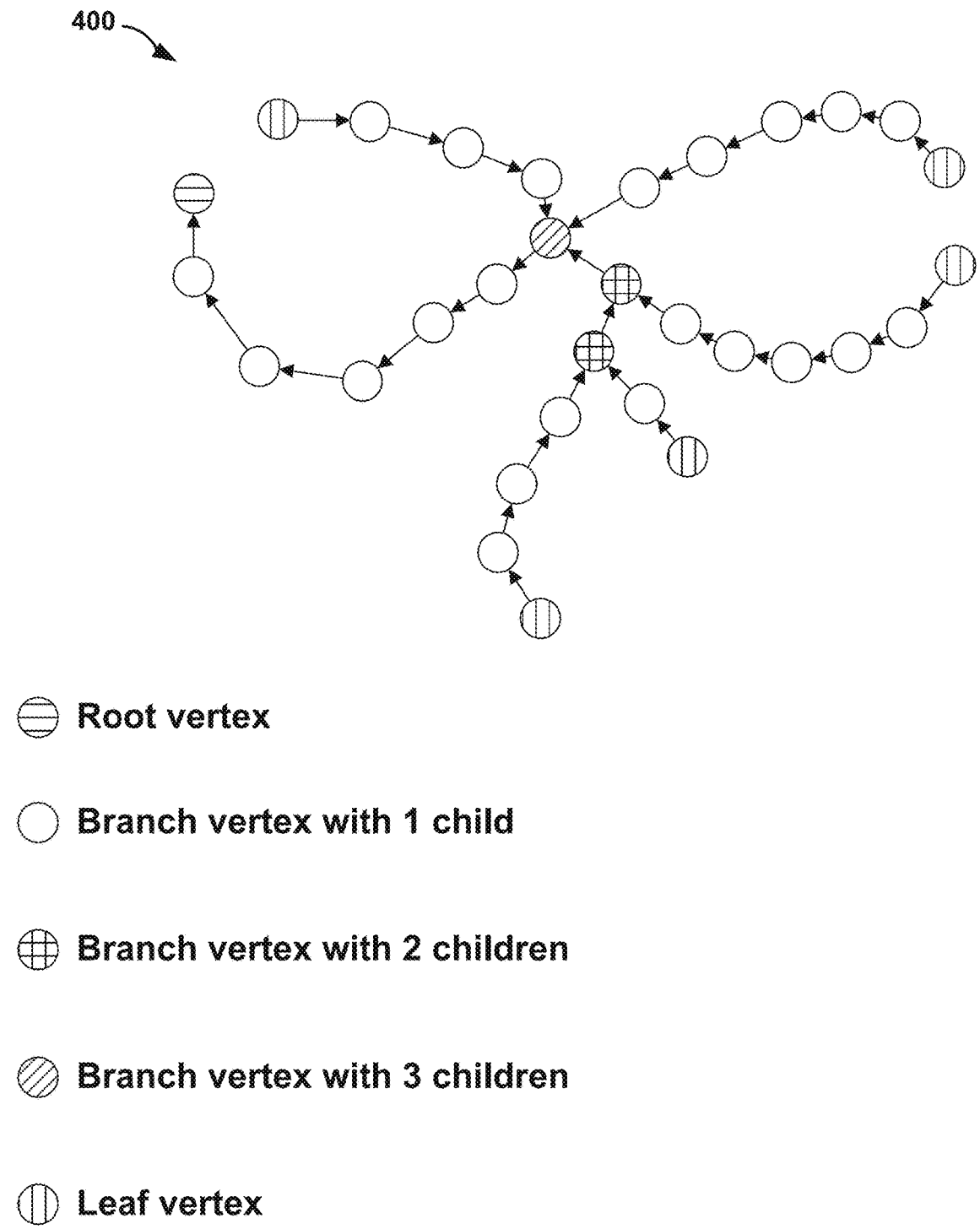
FIG. 4 is a conceptual diagram of a prediction tree for predictive geometry coding.

Predictive geometry coding was introduced as an alternative to the octree geometry coding, where the nodes are arranged in a tree structure (which defines the prediction structure), and various prediction strategies are used to predict the coordinates of each node in the tree with respect to its predictors. FIG. 4 is a conceptual diagram illustrating an example of a prediction tree 400, a directed graph where the arrow points to the prediction direction. The horizontally shaded node is the root vertex and has no predictors; the grid shaded nodes have two children; the diagonally shaded node has 3 children; the non-shaded nodes have one children and the vertically shaded nodes are leaf nodes and these have no children. Every node has only one parent node.

Four prediction strategies may be specified for each node based on its parent (p0), grand-parent (p1) and great-grandparent (p2). The prediction strategies include, no prediction, delta prediction (p0), linear prediction (2*p0−p1), and parallelogram prediction (2*p0+p1−p2).

The encoder (e.g., G-PCC encoder 200) may employ any algorithm to generate the prediction tree; the algorithm used may be determined based on the application/use case and several strategies may be used. The encoder may encode, for each node, the residual coordinate values in the bitstream starting from the root node in a depth-first manner. Predictive geometry coding may be particularly useful for Category 3 (LIDAR-acquired) point cloud data e.g., for low-latency applications.

Figure 5A:
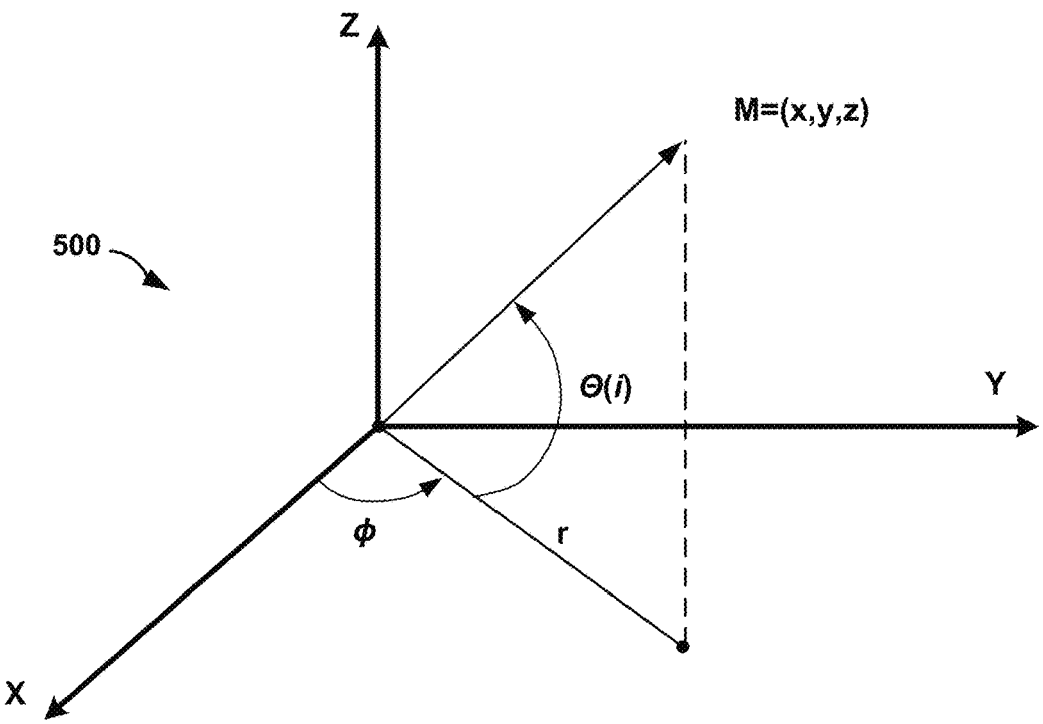
FIGS. 5A and 5B are conceptual diagrams of a spinning LIDAR acquisition model.
Figure 5B:
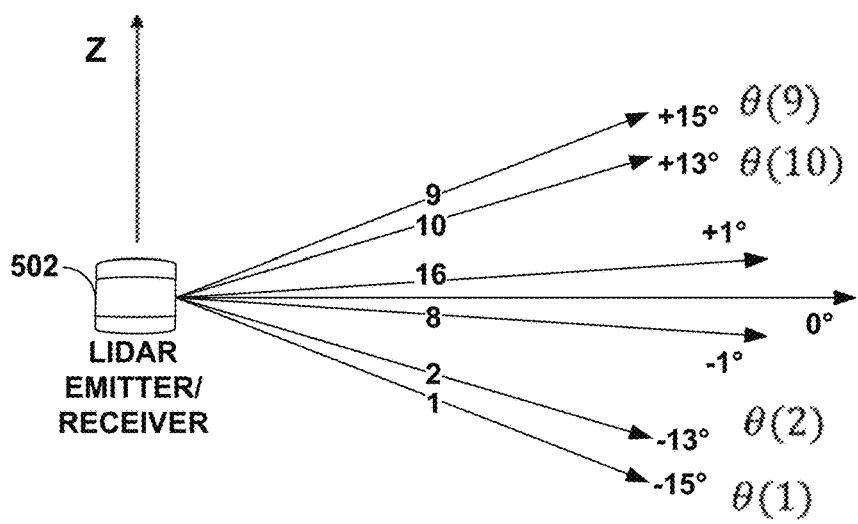

Angular mode may be used in predictive geometry coding, where the characteristics of LIDAR sensors may be utilized in coding the prediction tree more efficiently. The coordinates of the positions are converted to the (r, φ, i) (radius, azimuth, and laser index) and a prediction is performed in this domain (the residuals are coded in r, φ, i domain). Due to the errors in rounding, coding in r, φ, i is not lossless and hence a second set of residuals may be coded which correspond to the Cartesian coordinates. A description of the encoding and decoding strategies used for angular mode for predictive geometry coding is reproduced below. The description is based on FIGS. 5A and 5B, which are conceptual diagrams of a spinning LIDAR acquisition model.

The techniques of this disclosure may be applicable to at least point clouds acquired using a spinning Lidar model. Here, the lidar 502 has N lasers (e.g., N=16, 32, 64) spinning around the Z axis according to an azimuth angle φ (see FIGS. 5A and 5B). Each laser may have different elevation $\theta(i)_{i=1 \ldots N}$ and height $\varsigma(i)_{i=1 \ldots N}$. The laser i hits a point M, with cartesian integer coordinates (x, y, z), defined according to coordinate system 500 described in FIG. 5A.

The position of M is modelled with three parameters (r, φ, i), which are computed as follows:

$$r = \sqrt{x^2 + y^2}$$

$$\phi = atan2(y, x)$$

$$i = \arg \min_{j=1 \ldots N} \{z + \varsigma(j) - r \times \tan(\theta(j))\},$$

More precisely, the coding process may use the quantized version of (r, φ, i), denoted (r̃, φ̃, i), where the three integers r̃, φ̃ and i are computed as follows:

$$\tilde{r} = \text{floor}\left(\frac{\sqrt{x^2 + y^2}}{q_r} + o_r\right) = hypot(x, y)$$

$$\tilde{\phi} = \text{sign}(atan2(y, x)) \times \text{floor}\left(\frac{|atan2(y, x)|}{q_\phi} + o_\phi\right)$$

$$i = \arg \min_{j=1 \ldots N} \{z + \varsigma(j) - r \times \tan(\theta(j))\}$$

where
($q_r$, $o_r$) and ($q_\phi$, $o_\phi$) are quantization parameters controlling the precision of φ̃ and r̃, respectively.
sign(t) is the function that returns 1 if t is positive and (−1) otherwise.
|t| is the absolute value of t.

To avoid reconstruction mismatches due to the use of floating-point operations, the values of $\varsigma(i)_{i=1 \ldots N}$ and $\tan(\theta(i))_{i=1 \ldots N}$ may be pre-computed and quantized as follows:

$$z(i) = \text{sign}(\varsigma(i)) \times \text{floor}\left(\frac{|\varsigma(i)|}{q_\varsigma} + o_\varsigma\right)$$

$$\tilde{t}(i) = \text{sign}(\varsigma(\tan(\theta(j)))) \times \text{floor}\left(\frac{|\tan(\theta(j))|}{q_\theta} + o_\theta\right)$$

where
($q_\varsigma$, $o_\varsigma$) and ($q_\theta$, $o_\theta$) are quantization parameters controlling the precision of $\tilde{\varsigma}$ and $\tilde{\theta}$, respectively.
The reconstructed cartesian coordinates are obtained as follows:

$$\hat{x} = \text{round}(\tilde{r} \times q_r \times app\_cos(\tilde{\phi} \times q_\phi))$$

-continued $$\hat{y} = \text{round}(\tilde{r} \times q_r \times app\_sin(\tilde{\phi} \times q_\phi))$$

$$\hat{z} = \text{round}(\tilde{r} \times q_r \times \hat{t}(i) \times q_\theta - \tilde{z}(i) \times q_\varsigma),$$

where app_cos(·) and app_sin(·) are approximation of cos(·) and sin(·). The calculations could be using a fixed-point representation, a look-up table and linear interpolation.

In some examples, ($\hat{x}$, $\hat{y}$, $\hat{z}$) may be different from (x, y, z) due to various reasons, including:
quantization
approximations
model imprecision
model parameters imprecisions In some examples, the reconstruction residuals ($r_x$, $r_y$, $r_z$) can be defined as follows:

$$r_x = x - \hat{x}$$
$$r_y = y - \hat{y}$$
$$r_z = z - \hat{z}$$

In this method, the encoder may proceed as follows:

Encode the model parameters $\tilde{t}(i)$ and $\tilde{z}(i)$ and the quantization parameters $q_r$, $q_\varsigma$, $q_\theta$ and $q_\phi$ Apply the geometry predictive scheme described in G-PCC DIS to the representation ($\tilde{r}$, $\tilde{\phi}$, i)

A new predictor leveraging the characteristics of lidar could be introduced. For instance, the rotation speed of the lidar scanner around the z-axis is usually constant. Therefore, the G-PCC decoder may predict the current $\tilde{\phi}(j)$ as follows:

$$\tilde{\phi}(j) = \tilde{\phi}(j-1) + n(j) \times \delta_\phi(k)$$

Where $(\delta_\phi(k))_{k=1 \ldots K}$ is a set of potential speeds the encoder could choose from. The index k could be explicitly written to the bitstream or could be inferred from the context based on a deterministic strategy applied by both the encoder and the decoder, and n(j) is the number of skipped points, which could be explicitly written to the bitstream or could be inferred from the context based on a deterministic strategy applied by both the encoder and the decoder.

Encode with each node the reconstruction residuals ($r_x$, $r_y$, $r_z$)

The decoder may proceed as follows:

Decode the model parameters $\tilde{t}(i)$ and $\tilde{z}(i)$ and the quantization parameters $q_r$, $q_\varsigma$, $q_\theta$ and $q_\phi$ Decode the ($\tilde{r}$, $\tilde{\phi}$, i) parameters associated with the nodes according to the geometry predictive scheme described in G-PCC Draft International Standard (DIS)

Compute the reconstructed coordinates ($\hat{x}$, $\hat{y}$, $\hat{z}$) as described above Decode the residuals ($r_x$, $r_y$, $r_z$)

As discussed in the next section, lossy compression could be supported by quantizing the reconstruction residuals ($r_x$, $r_y$, $r_z$)

Compute the original coordinates (x, y, z) as follows $$x = r_x + \hat{x}$$
$$y = r_y + \hat{y}$$
$$z = r_z + \hat{z}$$

Lossy compression could be achieved by applying quantization to the reconstruction residuals ($r_x$, $r_y$, $r_z$) or by dropping points.

The quantized reconstruction residuals are computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_y} + o_y\right)$$

$$\tilde{r}_z = \text{sign}(r_z) \times \text{floor}\left(\frac{|r_z|}{q_z} + o_z\right)$$

Where ($q_x$, $o_x$), ($q_y$, $o_y$) and ($q_z$, $o_z$) are quantization parameters controlling the precision of $\tilde{r}_x$, $\tilde{r}_y$ and $\tilde{r}_z$, respectively.

In some examples, the encoder and/or decoder may use Trellis quantization to further improve the RD (rate-distortion) performance results. The quantization parameters may change at sequence/frame/slice/block level to achieve region adaptive quality and for rate control purposes.

However, the above-described techniques may present one or more disadvantages. For instance, the laser index i may form the third component of geometry when angular mode is used with predictive geometry coding. As the number of bits for signalling the laser residual may not be tightly bound (the number of bits for the maximum absolute residual is signalled as log 2), the reconstructed laser index could exceed valid a range of laser indices (greater than a number of lasers minus 1 or less than 0). This may result in an undefined behavior for the decoder when it tries to decode a bitstream that results in an invalid laser index value. Such undefined behavior may be undesirable.

A similar problem may apply to angular inferred direct coding mode (IDCM) context derivation (in octree coding), where a laser index residual is signalled. Here again, there may be no constraints on the laser index residual signalled; a bitstream may contain a laser index residual value which may result in a laser index value outside the valid range resulting in an undefined behaviour for the decoder. Such undefined behavior may be undesirable.

In accordance with one or more techniques of this disclosure, an encoder (e.g., G-PCC encoder 200) and/or a decoder (e.g., G-PCC decoder 300) may perform one or more operations to prevent a decoded laser index from exceeding a valid range of laser indices. In some examples, the valid range of laser indices may be less than or equal to the number of lasers minus 1 or greater than 0 (e.g., 0 to N−1, where N is the number of lasers). The below-described techniques may be used independently, or may be combined with each other. By preventing the decoded laser index from falling outside the valid range, the techniques of this disclosure may improve temporal scalability of G-PCC bitstreams.

As a first example technique, G-PCC encoder 200 and/or G-PCC decoder 300 may apply a constraint that the laser index obtained after the reconstruction of the primary residual when angular mode is used in predictive geometry coding is in the valid laser index range. In some examples, when N lasers are specified in the bitstream, the valid laser index range may be 0 to N−1, inclusive.

Two examples of the first technique follow. As a first example of the first technique, the following conformance constraint may be added so that the reconstructed laser index is in the valid laser index range: "It is a requirement of bitstream conformance that value of laser index reconstructed from the primary residuals when angular mode is used in predictive geometry shall be in the range of 0 to num_lasers_minus1, inclusive." In this example, num_lasers_minus1 is used to denote the value of number of lasers minus 1. As a second example of the first technique, the following conformance constraint may be added so that the reconstructed laser index is in the valid laser index range: "It is a requirement of bitstream conformance that value of laser index reconstructed shall be in the range of 0 to num_lasers_minus1, inclusive."

Behavior of G-PCC decoder 300 may be impacted where G-PCC encoder 200 enforces the constraint. For instance, where G-PCC encoder 200 constrains the value of the reconstructed laser index to be within the valid laser index range, G-PCC decoder 300 may accurately decode bits in the bitstream that follow bits that represent the reconstructed laser index, avoiding undefined behavior.

As a second example technique, G-PCC decoder 300 may clip the laser index generated by the reconstruction of the primary residual such that that clipped laser index falls in the valid laser index range.

An example of the second technique follows. In this example, G-PCC decoder 300 may clip the laser index value obtained by reconstructing the primary residual to be within the valid range of laser index. For instance, G-PCC decoder 300 may perform the following:

The reconstructed value of laser index, i, is updated by setting it equal to Clip3(i, 0, num_lasers_minus1).

In other words, the reconstructed cartesian coordinate $\hat{z}$ may be obtained as follows:

$$\hat{z} = \text{round}(\hat{r} \times q_r \times \hat{t}(\text{Clip3}(i, 0, \text{num\_lasers\_minus1})) \times q_\theta - \tilde{z}(\text{Clip3}(i, 0, \text{num\_lasers\_minus1})) \times q_s).$$

As a third example, G-PCC decoder 300 may perform a default behavior when the reconstructed laser index is outside the valid range of laser indices. For instance, when the laser index i does not correspond to a valid laser index (e.g., is outside the valid range of laser indices), the value of $\tilde{z}(i)$ and $\tilde{t}(i)$ may be inferred to be default values such that the behavior of the decoder is well-defined. For example, the default values of $\tilde{z}(i)$ may be set to be 0, and the default value of $\tilde{t}(i)$ may be set corresponding to an angle of 0 (i.e., value of $\tilde{t}(i)$ may also set to be 0).

As a fourth example, G-PCC encoder 200 and/or G-PCC decoder 300 may apply any combination of the first through third examples described above (e.g., clipping, explicit constraint, default behavior, etc.) to a laser index value derived from the laser index residual signalled for the angular IDCM context derivation. For instance, G-PCC encoder 200 and/or G-PCC decoder 300 may clip the laser index value obtained by using the laser index residual in the angular IDCM context derivation to the valid laser index range. As one explicit example, G-PCC encoder 200 and/or G-PCC decoder 300 may perform the following:

laserIndex[Child] =

Clip3(laserIndexEstimate[Child] + laserIndexResidual[Child], 0, num_lasers_minus1)

where laserIndexEstimate[Child]+laserIndexResidual[Child] is the laser index residual in the angular IDCM context derivation, 0 is the lower bound of the valid laser range, and num_lasers_minus 1 is the upper bound of the valid laser range.

Figure 6:
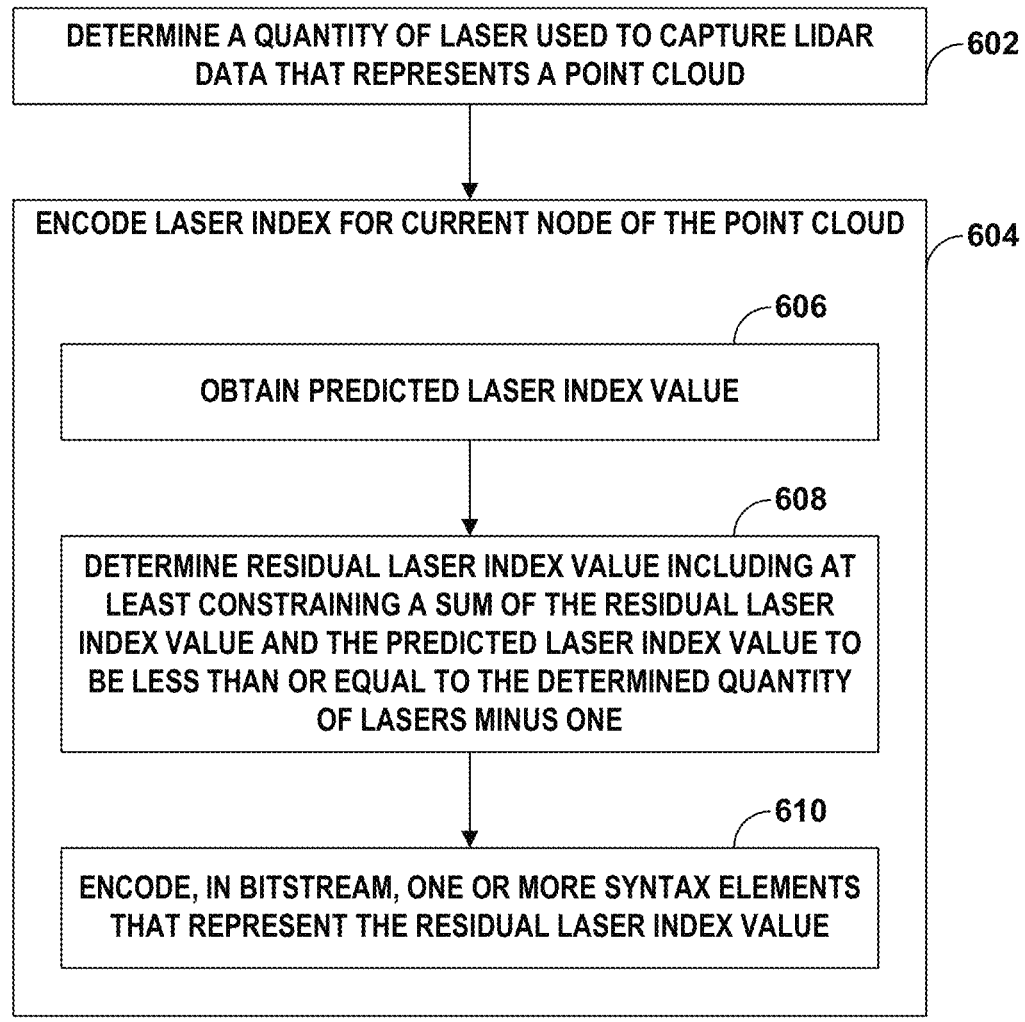
FIG. 6 is a flow diagram illustrating an example technique for processing a point cloud, in accordance with one or more techniques of this disclosure.

FIG. 6 is a flow diagram illustrating an example technique for processing a point cloud, in accordance with one or more techniques of this disclosure. Although described with respect to G-PCC encoder 200 (FIGS. 1 and 2), it should be understood that other devices may be configured to perform a method similar to that of FIG. 6.

G-PCC encoder 200 may determine a quantity of lasers used to capture light detection and ranging (LIDAR) data that represents a point cloud (602). For instance, G-PCC encoder 200 may determine that N lasers (e.g., N=16, 32, 64) were used to capture the LIDAR data (e.g., in any of the examples of FIGS. 7-10). In some examples, G-PCC encoder 200 may encode, in a bitstream, a syntax element that represents the determined quantity of lasers. For instance, G-PCC encoder may encode (e.g., in a geometry parameter set) a num_lasers_minus1 syntax element that represents the quantity of lasers minus one.

G-PCC encoder 200 may encode a laser index for a current node of the point cloud (604). As discussed above, as opposed to directly signaling the laser index for the current node, G-PCC encoder may signal a differential between a predicted laser index and the actual laser index for the current node. In some examples, G-PCC encoder 200 may encode the laser index value responsive to determining to encode the current node using an angular coding mode of predictive geometry coding.

For instance, G-PCC encoder 200 may obtain a predicted laser index value of the current node (606). The predicted laser index may be a laser index determined as a function of one or more of a parent node (p0) of the current node, a grandparent (p1) of the current node, and/or a great-grandparent (p2) of the current node (using one or more of delta prediction, linear prediction, or parallelogram prediction: see FIG. 4). In some examples, G-PCC encoder 200 may select a candidate laser index of a plurality of candidate predicted laser indices that most closely matches the laser index of the current node and signal a syntax element indicating which of the plurality of candidate predicted laser indices is the selected predicted laser index for the current node.

G-PCC encoder 200 may determine a residual laser index value for the current node (608). For instance, G-PCC encoder 200 may determine a difference between the actual laser index value for the current node and the selected predicted laser index value for the current node (e.g., where the actual laser index value is 4 and the predicted laser index value is 1, G-PCC encoder may determine the residual laser index value to be 3). A G-PCC decoder (e.g., G-PCC decoder 300) may reconstruct the actual laser index value by summing (e.g., adding) the predicted laser index value to the residual laser index value. However, due to errors in rounding and other sources, the reconstructed laser index i may exceed a valid range of laser indices (e.g., indicate a laser that does not exist). Such an outcome may result in undefined behaviour of the decoder, which may be undesirable.

In accordance with one or more techniques of this disclosure, G-PCC encoder 200 may constrain a value of the reconstructed laser index to be within a valid range of laser indices. For instance, G-PCC encoder 200 may determine the residual laser index value (608) by at least constraining a sum of the residual laser index value and the predicted laser index value to be less than or equal to the determined quantity of lasers minus one. As one example, responsive to determining that a laser index of the current node will be reconstructed outside the valid range of laser indices, G-PCC encoder 200 may adjust encoding of the laser index of the current node such that the laser index will be reconstructed within the valid range (e.g., by reducing the value of the residual laser index).

G-PCC encoder 200 may encode, in the bitstream, one or more syntax elements that represent the residual laser index value (610). For instance, G-PCC encoder 200 may encode a first syntax element that indicates whether an absolute value of the residual laser index value is greater than zero. If the absolute value of the residual laser index value is greater than zero, G-PCC encoder 200 may encode a second syntax element that represents the absolute value of the residual laser index value, and a third syntax element that represents a sign of the residual laser index value.

Figure 7:
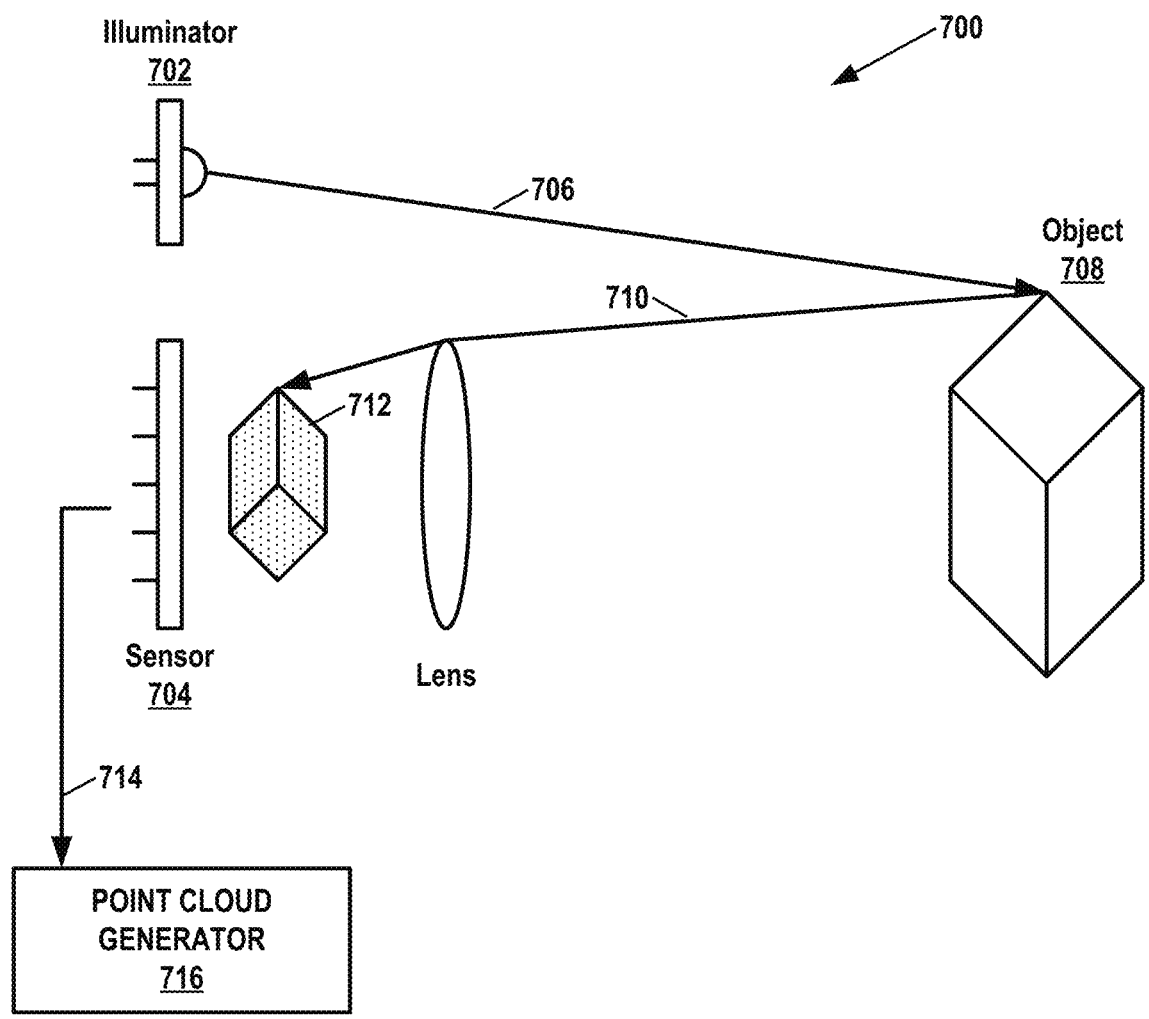
FIG. 7 is a conceptual diagram illustrating an example range-finding system that may be used with one or more techniques of this disclosure.

FIG. 7 is a conceptual diagram illustrating an example range-finding system 700 that may be used with one or more techniques of this disclosure. In the example of FIG. 7, range-finding system 700 includes an illuminator 702 and a sensor 704. Illuminator 702 may emit light 706. In some examples, illuminator 702 may emit light 706 as one or more laser beams. Light 706 may be in one or more wavelengths, such as an infrared wavelength or a visible light wavelength. In other examples, light 706 is not coherent, laser light. When light 706 encounters an object, such as object 708, light 706 creates returning light 710. Returning light 710 may include backscattered and/or reflected light. Returning light 710 may pass through a lens 711 that directs returning light 710 to create an image 712 of object 708 on sensor 704. Sensor 704 generates signals 714 based on image 712. Image 712 may comprise a set of points (e.g., as represented by dots in image 712 of FIG. 8).

In some examples, illuminator 702 and sensor 704 may be mounted on a spinning structure so that illuminator 702 and sensor 704 capture a 360-degree view of an environment. In other examples, range-finding system 700 may include one or more optical components (e.g., mirrors, collimators, diffraction gratings, etc.) that enable illuminator 702 and sensor 704 to detect ranges of objects within a specific range (e.g., up to 360-degrees). Although the example of FIG. 7 only shows a single illuminator 702 and sensor 704, range-finding system 700 may include multiple sets of illuminators and sensors.

In some examples, illuminator 702 generates a structured light pattern. In such examples, range-finding system 700 may include multiple sensors 704 upon which respective images of the structured light pattern are formed. Range-finding system 700 may use disparities between the images of the structured light pattern to determine a distance to an object 708 from which the structured light pattern backscatters. Structured light-based range-finding systems may have a high level of accuracy (e.g., accuracy in the sub-millimeter range), when object 708 is relatively close to sensor 704 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 700 is a time of flight (ToF)-based system. In some examples where range-finding system 700 is a ToF-based system, illuminator 702 generates pulses of light. In other words, illuminator 702 may modulate the amplitude of emitted light 706. In such examples, sensor 704 detects returning light 710 from the pulses of light 706 generated by illuminator 702. Range-finding system 700 may then determine a distance to object 708 from which light 706 backscatters based on a delay between when light 706 was emitted and detected and the known speed of light in air). In some examples, rather than (or in addition to) modulating the amplitude of the emitted light 706, illuminator 702 may modulate the phase of the emitted light 706. In such examples, sensor 704 may detect the phase of returning light 710 from object 708 and determine distances to points on object 708 using the speed of light and based on time differences between when illuminator 702 generated light 706 at a specific phase and when sensor 704 detected returning light 710 at the specific phase.

In other examples, a point cloud may be generated without using illuminator 702. For instance, in some examples, sensors 704 of range-finding system 700 may include two or more optical cameras. In such examples, range-finding system 700 may use the optical cameras to capture stereo images of the environment, including object 708. Range-finding system 700 may include a point cloud generator 716 that may calculate the disparities between locations in the stereo images. Range-finding system 700 may then use the disparities to determine distances to the locations shown in the stereo images. From these distances, point cloud generator 716 may generate a point cloud.

Sensors 704 may also detect other attributes of object 708, such as color and reflectance information. In the example of FIG. 7, a point cloud generator 716 may generate a point cloud based on signals 714 generated by sensor 704. Range-finding system 700 and/or point cloud generator 716 may form part of data source 104 (FIG. 1). Hence, a point cloud generated by range-finding system 700 may be encoded and/or decoded according to any of the techniques of this disclosure.

Figure 8:
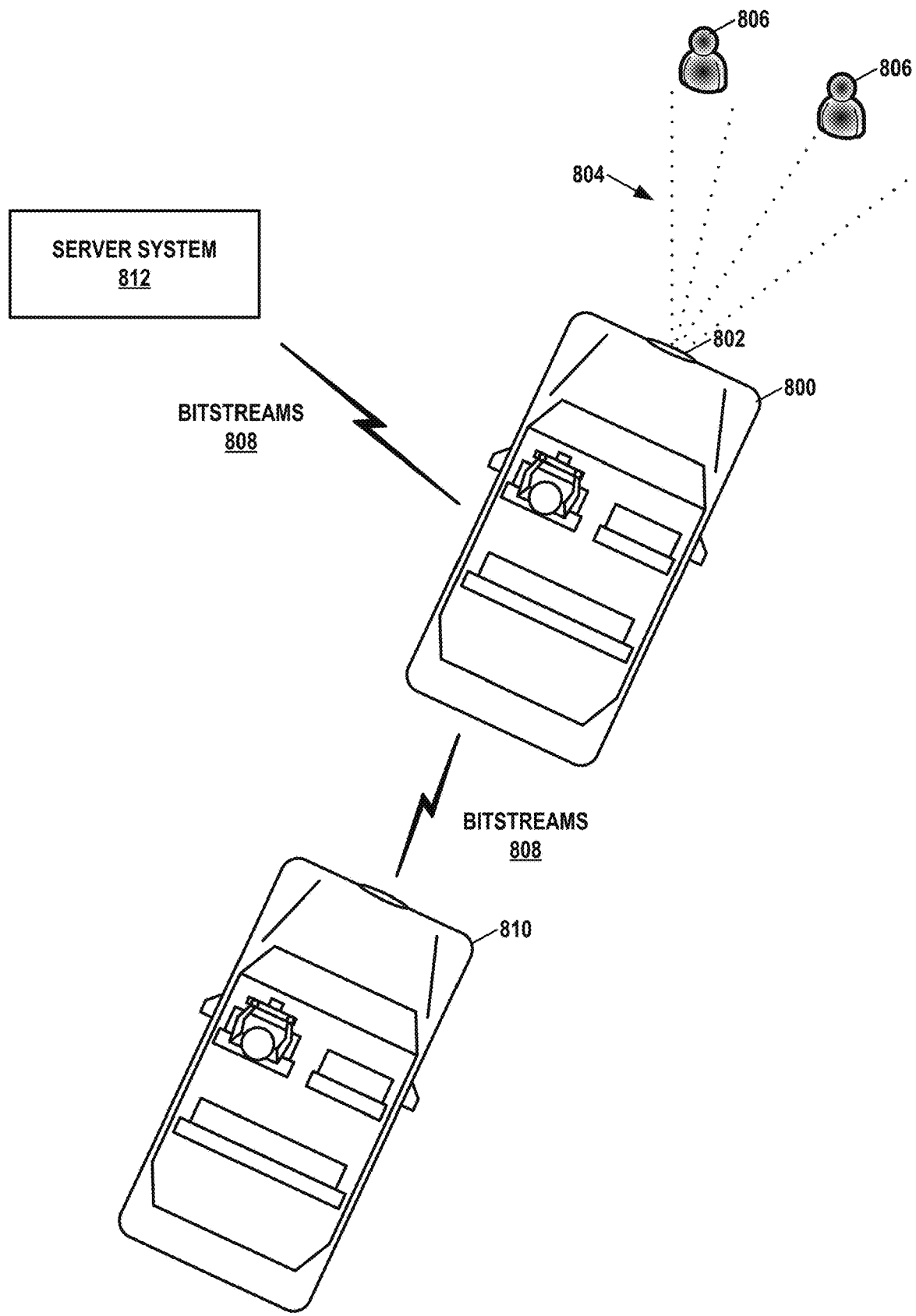
FIG. 8 is a conceptual diagram illustrating an example vehicle-based scenario in which one or more techniques of this disclosure may be used.

FIG. 8 is a conceptual diagram illustrating an example vehicle-based scenario in which one or more techniques of this disclosure may be used. In the example of FIG. 8, a vehicle 800 includes a range-finding system 802. Range-finding system 802 may be implemented in the manner discussed with respect to FIG. 8. Although not shown in the example of FIG. 8, vehicle 800 may also include a data source, such as data source 104 (FIG. 1), and a G-PCC encoder, such as G-PCC encoder 200 (FIG. 1). In the example of FIG. 8, range-finding system 802 emits laser beams 804 that reflect off pedestrians 806 or other objects in a roadway. The data source of vehicle 800 may generate a point cloud based on signals generated by range-finding system 802. The G-PCC encoder of vehicle 800 may encode the point cloud to generate bitstreams 808, such as geometry bitstream (FIG. 2) and attribute bitstream (FIG. 2). Bitstreams 808 may include many fewer bits than the unencoded point cloud obtained by the G-PCC encoder.

An output interface of vehicle 800 (e.g., output interface 108 (FIG. 1) may transmit bitstreams 808 to one or more other devices. Bitstreams 808 may include many fewer bits than the unencoded point cloud obtained by the G-PCC encoder. Thus, vehicle 800 may be able to transmit bitstreams 808 to other devices more quickly than the unencoded point cloud data. Additionally, bitstreams 808 may require less data storage capacity.

In the example of FIG. 8, vehicle 800 may transmit bitstreams 808 to another vehicle 810. Vehicle 810 may include a G-PCC decoder, such as G-PCC decoder 300 (FIG. 1). The G-PCC decoder of vehicle 810 may decode bitstreams 808 to reconstruct the point cloud. Vehicle 810 may use the reconstructed point cloud for various purposes. For instance, vehicle 810 may determine based on the reconstructed point cloud that pedestrians 806 are in the roadway ahead of vehicle 800 and therefore start slowing down, e.g., even before a driver of vehicle 810 realizes that pedestrians 806 are in the roadway. Thus, in some examples, vehicle 810 may perform an autonomous navigation operation based on the reconstructed point cloud.

Additionally or alternatively, vehicle 800 may transmit bitstreams 808 to a server system 812. Server system 812 may use bitstreams 808 for various purposes. For example, server system 812 may store bitstreams 808 for subsequent reconstruction of the point clouds. In this example, server system 812 may use the point clouds along with other data (e.g., vehicle telemetry data generated by vehicle 800) to train an autonomous driving system. In other example, server system 812 may store bitstreams 808 for subsequent reconstruction for forensic crash investigations.

Figure 9:
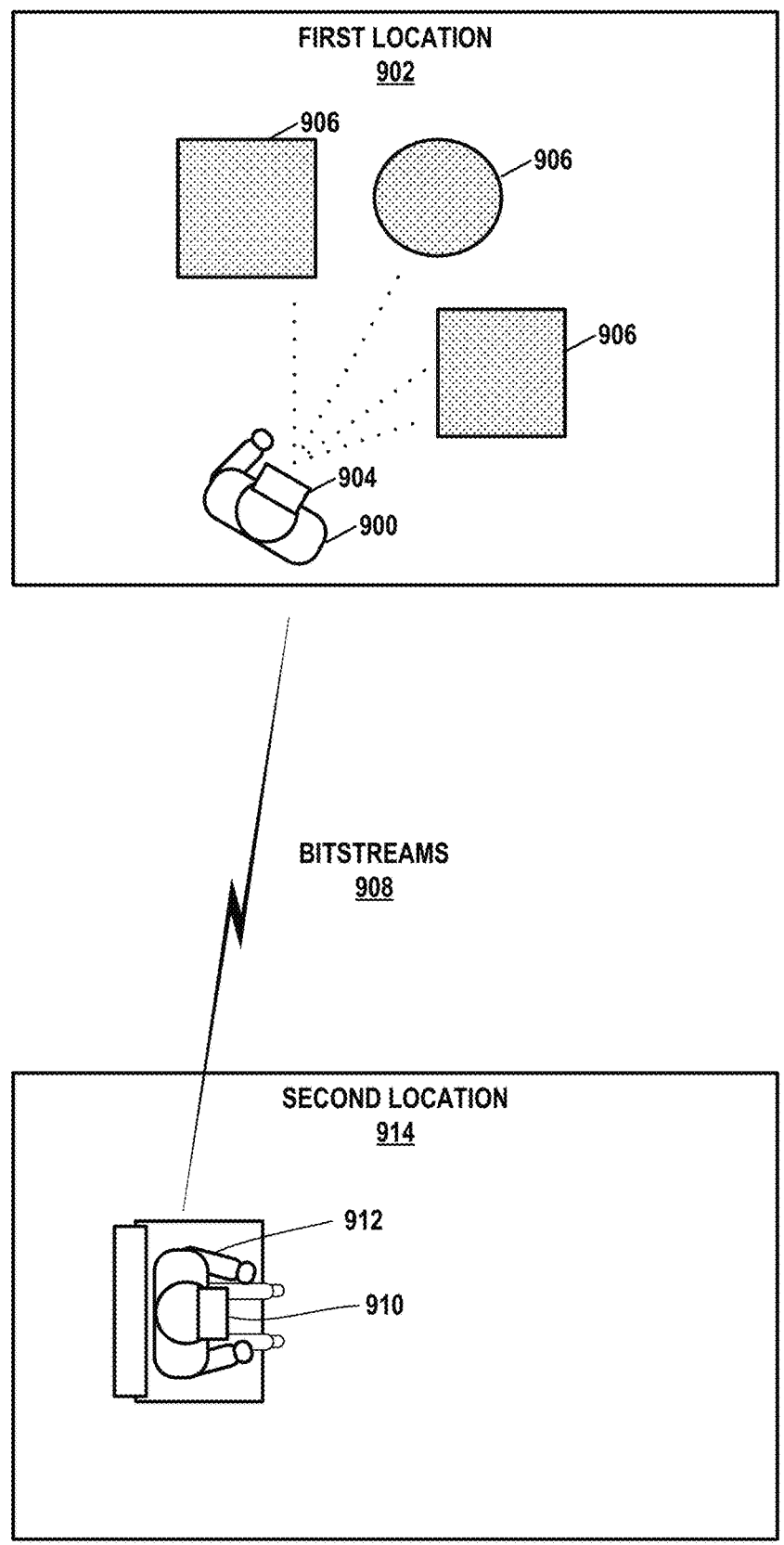
FIG. 9 is a conceptual diagram illustrating an example extended reality system in which one or more techniques of this disclosure may be used.

FIG. 9 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 9, a user 900 is located in a first location 902. User 900 wears an XR headset 904. As an alternative to XR headset 904, user 900 may use a mobile device (e.g., mobile phone, tablet computer, etc.). XR headset 904 includes a depth detection sensor, such as a range-finding system, that detects positions of points on objects 906 at location 902. A data source of XR headset 904 may use the signals generated by the depth detection sensor to generate a point cloud representation of objects 906 at location 902. XR headset 904 may include a G-PCC encoder (e.g., G-PCC encoder 200 of FIG. 1) that is configured to encode the point cloud to generate bitstreams 908.

XR headset 904 may transmit bitstreams 908 (e.g., via a network such as the Internet) to an XR headset 910 worn by a user 912 at a second location 914. XR headset 910 may decode bitstreams 908 to reconstruct the point cloud. XR headset 910 may use the point cloud to generate an XR visualization (e.g., an AR, MR, VR visualization) representing objects 906 at location 902. Thus, in some examples, such as when XR headset 910 generates an VR visualization, user 912 may have a 3D immersive experience of location 902. In some examples, XR headset 910 may determine a position of a virtual object based on the reconstructed point cloud. For instance, XR headset 910 may determine, based on the reconstructed point cloud, that an environment (e.g., location 902) includes a flat surface and then determine that a virtual object (e.g., a cartoon character) is to be positioned on the flat surface. XR headset 910 may generate an XR visualization in which the virtual object is at the determined position. For instance, XR headset 910 may show the cartoon character sitting on the flat surface.

Figure 10:
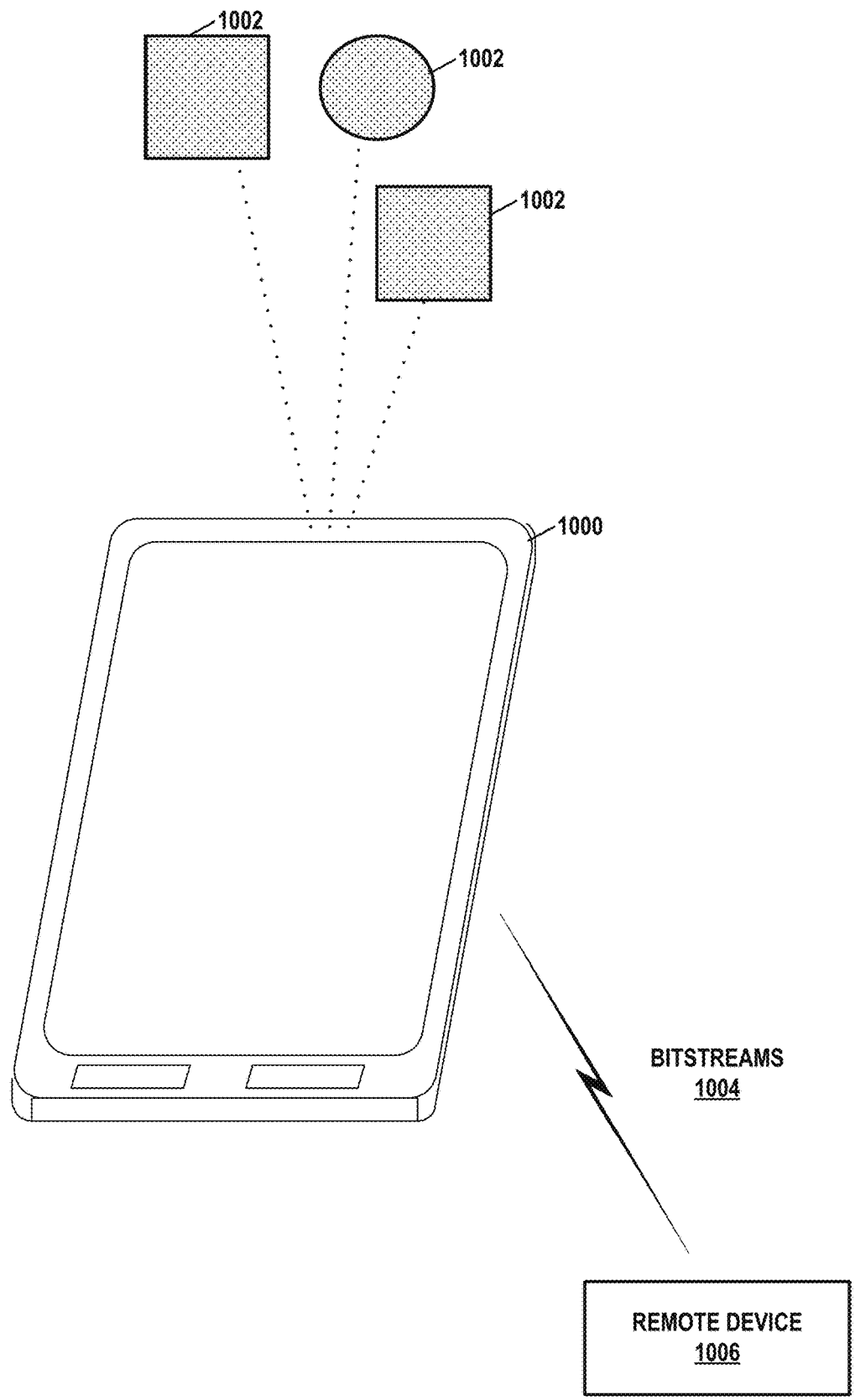
FIG. 10 is a conceptual diagram illustrating an example mobile device system in which one or more techniques of this disclosure may be used.

FIG. 10 is a conceptual diagram illustrating an example mobile device system in which one or more techniques of this disclosure may be used. In the example of FIG. 10, a mobile device 1000, such as a mobile phone or tablet computer, includes a range-finding finding system, such as a LIDAR system, that detects positions of points on objects 1002 in an environment of mobile device 1000. A data source of mobile device 1000 may use the signals generated by the depth detection sensor to generate a point cloud representation of objects 1002. Mobile device 1000 may include a G-PCC encoder (e.g., G-PCC encoder 200 of FIG. 1) that is configured to encode the point cloud to generate bitstreams 1004. In the example of FIG. 10, mobile device 1000 may transmit bitstreams to a remote device 1006, such as a server system or other mobile device. Remote device 1006 may decode bitstreams 1004 to reconstruct the point cloud. Remote device 1006 may use the point cloud for various purposes. For example, remote device 1006 may use the point cloud to generate a map of environment of mobile device 1000. For instance, remote device 1006 may generate a map of an interior of a building based on the reconstructed point cloud. In another example, remote device 1006 may generate imagery (e.g., computer graphics) based on the point cloud. For instance, remote device 1006 may use points of the point cloud as vertices of polygons and use color attributes of the points as the basis for shading the polygons. In some examples, remote device 1006 may use the reconstructed point cloud for facial recognition or other security applications.

The following numbered clauses may illustrate one or more aspects of this disclosure:

Clause 1A. A method of processing a point cloud, the method comprising: determining a valid range for laser indices; obtaining a laser index value of light detection and ranging (LIDAR) data that represents the point cloud; constraining the reconstructed laser index value to be within the determined valid range; and encoding, in a bitstream, the constrained reconstructed laser index.

Clause 1B. A method of processing a point cloud, the method comprising: determining a valid range for laser indices; reconstructing, based on a bitstream, a laser index value of light detection and ranging (LIDAR) data that represents the point cloud; clipping the reconstructed laser index value to be within the determined valid range; and decoding, based on the clipped reconstructed laser index, the point cloud.

Clause 2B. The method of clause 1B, wherein the valid range includes a minimum value and a maximum value, and wherein clipping the reconstructed laser index value comprises: increasing the reconstructed laser index value to the minimum value where the reconstructed laser index value is less than the minimum value; or reducing the reconstructed laser index value to the maximum value where the reconstructed laser index value is greater than the minimum value.

Clause 1C. A method of processing a point cloud, the method comprising: determining a valid range for laser indices; reconstructing, based on a bitstream, a laser index value of light detection and ranging (LIDAR) data that represents the point cloud; responsive to determining that the reconstructed laser index value is not within the determined valid range, inferring default values for one or more model parameters; and decoding, based on the default values for the one or more model parameters, the point cloud.

Clause 2C. The method of clause 1C, wherein the one or more model parameters comprise one or both of $\tilde{z}(i)$ and $\tilde{t}(i)$.

Clause 3C. The method of clause 2C, wherein inferring a default value for $\tilde{z}(i)$ comprises inferring a value of $\tilde{z}(i)$ to be 0.

Clause 4C. The method of clause 2C or 3C, wherein inferring a default value for $\tilde{t}(i)$ comprises inferring a value of $\tilde{t}(i)$ to be 0.

Clause 1D. A method of processing a point cloud, the method comprising: determining a valid range for laser indices; reconstructing, based on a bitstream and using a laser index residual in an angular inferred direct coding mode (IDCM) context derivation, a laser index value of light detection and ranging (LIDAR) data that represents the point cloud; clipping the reconstructed laser index value to be within the determined valid range; and decoding, based on the clipped reconstructed laser index, the point cloud.

Clause 1E. A method of encoding a point cloud, the method comprising: determining, by one or more processors, a quantity of lasers used to capture light detection and ranging (LIDAR) data that represents the point cloud; and encoding, by the one or more processors, a laser index for a current node of the point cloud, wherein encoding the laser index comprises: obtaining a predicted laser index value of the current node; determining a residual laser index value for the current node, wherein determining the residual laser index value comprises constraining a sum of the residual laser index value and the predicted laser index value based on the determined quantity of lasers; and encoding, in a bitstream, one or more syntax elements that represent the residual laser index value.

Clause 2E. The method of clause 1E, wherein constraining the sum of the residual laser index value and the predicted laser index value based on the determined quantity of lasers comprises: constraining the sum of the residual laser index value and the predicted laser index value to be: greater than or equal to zero and less than or equal to the determined quantity of lasers minus one.

Clause 3E. The method of clause 2E, wherein constraining the sum of the residual laser index value and the predicted laser index value comprises clipping the sum of the residual laser index value and the predicted laser index value to be: greater than or equal to zero and less than or equal to the determined quantity of lasers minus one.

Clause 4E. The method of clause 1E, further comprising: encoding, in the bitstream, a syntax element that represents the determined quantity of lasers.

Clause 5E. The method of clause 1E, wherein encoding the laser index comprises encoding the laser index responsive to determining to encode the current node using an angular coding mode of predictive geometry coding.

Clause 6E. The method of clause 1E, wherein the one or more processors are included in a vehicle or a head mounted device (HMD).

Clause 7E. A method of decoding a point cloud, the method comprising: determining, by one or more processors, a quantity of lasers used to capture light detection and ranging (LIDAR) data that represents the point cloud; and decoding, by the one or more processors, a laser index for a current node of the point cloud, wherein decoding the laser index comprises: obtaining a predicted laser index value of the current node; decoding, from a bitstream, one or more syntax elements that represent a residual laser index value for the current node; and reconstructing, as a sum of the residual laser index value and the predicted laser index value, the laser index of the current node, wherein the laser index of the current node is constrained based on the determined quantity of lasers.

Clause 8E. The method of clause 7E, wherein to be constrained based on the determined quantity of lasers, the laser index of the current node is constrained to be: greater than or equal to zero and less than or equal to the determined quantity of lasers minus one.

Clause 9E. The method of clause 8E, wherein to be constrained based on the determined quantity of lasers, the laser index of the current node is clipped to be: greater than or equal to zero and less than or equal to the determined quantity of lasers minus one.

Clause 10E. The method of clause 7E, further comprising: decoding, from the bitstream, a syntax element that represents the determined quantity of lasers.

Clause 11E. The method of clause 7E, wherein decoding the laser index comprises decoding the laser index responsive to determining that the current node is encoded using an angular coding mode of predictive geometry coding.

Clause 12E. A device for encoding a point cloud, the device comprising: a memory configured to store at least a portion of the point cloud; and one or more processors implemented in circuitry and configured to: determine a quantity of lasers used to capture light detection and ranging (LIDAR) data that represents the point cloud; and encode a laser index for a current node of the point cloud, wherein, to encode the laser index, the one or more processors are configured to: obtain a predicted laser index value of the current node; determine a residual laser index value for the current node, wherein, to determine the residual laser index value, the one or more processors are configured to constrain a sum of the residual laser index value and the predicted laser index value based on the determined quantity of lasers; and encode, in a bitstream, one or more syntax elements that represent the residual laser index value.

Clause 13E. The device of clause 12E, wherein, to constrain the sum of the residual laser index value and the predicted laser index value based on the determined quantity of lasers, the one or more processors are configured to: constrain the sum of the residual laser index value and the predicted laser index value based on the determined quantity of lasers to be: greater than or equal to zero and less than or equal to the determined quantity of lasers minus one.

Clause 14E. The device of clause 13E, wherein, to constrain the sum of the residual laser index value and the predicted laser index value, the one or more processors are configured to: clip the sum of the residual laser index value and the predicted laser index value based on the determined quantity of lasers to be: greater than or equal to zero and less than or equal to the determined quantity of lasers minus one.

Clause 15E. The device of clause 12E, wherein the one or more processors are further configured to: encode, in the bitstream, a syntax element that represents the determined quantity of lasers.

Clause 16E. The device of clause 12E, wherein, to encode the laser index, the one or more processors are configured to encode the laser index responsive to determining to encode the current node using an angular coding mode of predictive geometry coding.

Clause 17E. The device of clause 12E, wherein the device is a vehicle or a head mounted device (HMD).

Clause 18E. A device for decoding a point cloud, the device comprising: a memory configured to store at least a portion of the point cloud; and one or more processors implemented in circuitry and configured to: determine a quantity of lasers used to capture light detection and ranging (LIDAR) data that represents the point cloud; and decode a laser index for a current node of the point cloud, wherein, to decode the laser index, the one or more processors are configured to: obtain a predicted laser index value of the current node; decode, from a bitstream, one or more syntax elements that represent a residual laser index value for the current node; and reconstruct, as a sum of the residual laser index value and the predicted laser index value, the laser index of the current node, wherein the laser index of the current node is constrained based on the determined quantity of lasers.

Clause 19E. The device of clause 18E, wherein to be constrained based on the determined quantity of lasers, the laser index of the current node is constrained to be: greater than or equal to zero and less than or equal to the determined quantity of lasers minus one.

Clause 20E. The device of clause 19E, wherein to be constrained based on the determined quantity of lasers, the laser index of the current node is clipped to be: greater than or equal to zero and less than or equal to the determined quantity of lasers minus one.

Clause 21E. The device of clause 18E, wherein the one or more processors are further configured to: decode, from the bitstream, a syntax element that represents the determined quantity of lasers.

Clause 22E. The device of clause 18E, wherein, to decode the laser index, the one or more processors are configured to decode the laser index responsive to determining that the current node is encoded using an angular coding mode of predictive geometry coding.

Clause 1F. A method of encoding a point cloud, the method comprising: determining, by one or more processors, a quantity of lasers used to capture light detection and ranging (LIDAR) data that represents the point cloud; and encoding, by the one or more processors, a laser index for a current node of the point cloud, wherein encoding the laser index comprises: obtaining a predicted laser index value of the current node; determining a residual laser index value for the current node, wherein determining the residual laser index value comprises constraining a sum of the residual laser index value and the predicted laser index value based on the determined quantity of lasers; and encoding, in a bitstream, one or more syntax elements that represent the residual laser index value.

Clause 2F. The method of clause 1F, wherein constraining the sum of the residual laser index value and the predicted laser index value based on the determined quantity of lasers comprises: constraining the sum of the residual laser index value and the predicted laser index value to be: greater than or equal to zero and less than or equal to the determined quantity of lasers minus one.

Clause 3F. The method of clause 2F, wherein constraining the sum of the residual laser index value and the predicted laser index value comprises clipping the sum of the residual laser index value and the predicted laser index value to be: greater than or equal to zero and less than or equal to the determined quantity of lasers minus one.

Clause 4F. The method of any of clauses 1F-3F, further comprising: encoding, in the bitstream, a syntax element that represents the determined quantity of lasers.

Clause 5F. The method of any of clauses 1F-4F, wherein encoding the laser index comprises encoding the laser index responsive to determining to encode the current node using an angular coding mode of predictive geometry coding.

Clause 6F. The method of any of clauses 1F-5F, wherein the one or more processors are included in a vehicle or a head mounted device (HMD).

Clause 7F. A method of decoding a point cloud, the method comprising: determining, by one or more processors, a quantity of lasers used to capture light detection and ranging (LIDAR) data that represents the point cloud; and decoding, by the one or more processors, a laser index for a current node of the point cloud, wherein decoding the laser index comprises: obtaining a predicted laser index value of the current node; decoding, from a bitstream, one or more syntax elements that represent a residual laser index value for the current node; and reconstructing, as a sum of the residual laser index value and the predicted laser index value, the laser index of the current node, wherein the laser index of the current node is constrained based on the determined quantity of lasers.

Clause 8F. The method of clause 7F, wherein to be constrained based on the determined quantity of lasers, the laser index of the current node is constrained to be: greater than or equal to zero and less than or equal to the determined quantity of lasers minus one.

Clause 9F. The method of clause 8F, wherein to be constrained based on the determined quantity of lasers, the laser index of the current node is clipped to be: greater than or equal to zero and less than or equal to the determined quantity of lasers minus one.

Clause 10F. The method of any of clauses 7F-9F, further comprising: decoding, from the bitstream, a syntax element that represents the determined quantity of lasers.

Clause 11F. The method of any of clauses 7F-10F, wherein decoding the laser index comprises decoding the laser index responsive to determining that the current node is encoded using an angular coding mode of predictive geometry coding.

Clause 12F. A device for encoding a point cloud, the device comprising: a memory configured to store at least a portion of the point cloud; and one or more processors implemented in circuitry and configured to: determine a quantity of lasers used to capture light detection and ranging (LIDAR) data that represents the point cloud; and encode a laser index for a current node of the point cloud, wherein, to encode the laser index, the one or more processors are configured to: obtain a predicted laser index value of the current node; determine a residual laser index value for the current node, wherein, to determine the residual laser index value, the one or more processors are configured to constrain a sum of the residual laser index value and the predicted laser index value based on the determined quantity of lasers; and encode, in a bitstream, one or more syntax elements that represent the residual laser index value.

Clause 13F. The device of clause 12F, wherein, to constrain the sum of the residual laser index value and the predicted laser index value based on the determined quantity of lasers, the one or more processors are configured to: constrain the sum of the residual laser index value and the predicted laser index value based on the determined quantity of lasers to be: greater than or equal to zero and less than or equal to the determined quantity of lasers minus one.

Clause 14F. The device of clause 13F, wherein, to constrain the sum of the residual laser index value and the predicted laser index value, the one or more processors are configured to: clip the sum of the residual laser index value and the predicted laser index value based on the determined quantity of lasers to be: greater than or equal to zero and less than or equal to the determined quantity of lasers minus one.

Clause 15F. The device of any of clauses 12F-14F, wherein the one or more processors are further configured to: encode, in the bitstream, a syntax element that represents the determined quantity of lasers.

Clause 16F. The device of any of clauses 12F-15F, wherein, to encode the laser index, the one or more processors are configured to encode the laser index responsive to determining to encode the current node using an angular coding mode of predictive geometry coding.

Clause 17F. The device of any of clauses 12F-16F, wherein the device is a vehicle or a head mounted device (HMD).

Clause 18F. A device for decoding a point cloud, the device comprising: a memory configured to store at least a portion of the point cloud; and one or more processors implemented in circuitry and configured to: determine a quantity of lasers used to capture light detection and ranging (LIDAR) data that represents the point cloud; and decode a laser index for a current node of the point cloud, wherein, to decode the laser index, the one or more processors are configured to: obtain a predicted laser index value of the current node; decode, from a bitstream, one or more syntax elements that represent a residual laser index value for the current node; and reconstruct, as a sum of the residual laser index value and the predicted laser index value, the laser index of the current node, wherein the laser index of the current node is constrained based on the determined quantity of lasers.

Clause 19F. The device of clause 18F, wherein to be constrained based on the determined quantity of lasers, the laser index of the current node is constrained to be: greater than or equal to zero and less than or equal to the determined quantity of lasers minus one.

Clause 20F. The device of clause 19F, wherein to be constrained based on the determined quantity of lasers, the laser index of the current node is clipped to be: greater than or equal to zero and less than or equal to the determined quantity of lasers minus one.

Clause 21F. The device of any of clauses 18F-20F, wherein the one or more processors are further configured to: decode, from the bitstream, a syntax element that represents the determined quantity of lasers.

Clause 22F. The device of any of clauses 18F-21F, wherein, to decode the laser index, the one or more processors are configured to decode the laser index responsive to determining that the current node is encoded using an angular coding mode of predictive geometry coding.

Clause 1Z. A device for processing a point cloud, the device comprising one or more means for performing the method of any of clauses 1A-22F.

Clause 2Z. The device of clause 1Z, wherein the one or more means comprise one or more processors implemented in circuitry.

Clause 3Z. The device of any of clauses 1Z or 2Z, further comprising a memory to store the data representing the point cloud.

Clause 4Z. The device of any of clauses 1Z-3Z, wherein the device comprises a decoder.

Clause 5Z. The device of any of clauses 1Z-4Z, wherein the device comprises an encoder.

Clause 6Z. The device of any of clauses 1Z-5Z, further comprising a device to generate the point cloud.

Clause 7Z. The device of any of clauses 1Z-6Z, further comprising a display to present imagery based on the point cloud.

Clause 8Z. A computer-readable storage medium having stored thereon instructions that, when executed, cause one or more processors to perform the method of any of clauses 1A-22F.

Examples in the various aspects of this disclosure may be used individually or in any combination.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or

What is claimed is:

1. A method of decoding a point cloud, the method comprising:
    determining, by one or more processors, a quantity of lasers used to capture light detection and ranging (LIDAR) data that represents the point cloud; and
    deriving, by the one or more processors, a laser index for a current child node of the point cloud, wherein deriving the laser index comprises:
        obtaining an estimated laser index value of the current child node;
        obtaining a residual laser index value for the current child node; and
        reconstructing, as a sum of the residual laser index value and the estimated laser index value, the laser index of the current child node, wherein the laser index of the current child node is constrained based on the determined quantity of lasers.

2. The method of claim 1, wherein to be constrained based on the determined quantity of lasers, the laser index of the current child node is constrained to be: greater than or equal to zero and less than or equal to the determined quantity of lasers minus one.

3. The method of claim 2, wherein to be constrained based on the determined quantity of lasers, the laser index of the current child node is clipped to be: greater than or equal to zero and less than or equal to the determined quantity of lasers minus one.

4. The method of claim 1, further comprising:
    decoding, from a bitstream, a syntax element that represents the determined quantity of lasers.

5. The method of claim 1, wherein deriving the laser index comprises decoding the laser index responsive to determining that the current child node is encoded using an angular inferred direct coding mode (IDCM) of predictive geometry coding.

6. A device for decoding a point cloud, the device comprising:
    a memory configured to store at least a portion of the point cloud; and
    one or more processors implemented in circuitry and configured to:
        determine a quantity of lasers used to capture light detection and ranging (LIDAR) data that represents the point cloud; and
        derive a laser index for a current child node of the point cloud, wherein, to derive the laser index, the one or more processors are configured to:
            obtain an estimated laser index value of the current child node;
            obtain a residual laser index value for the current child node; and
            reconstruct, as a sum of the residual laser index value and the estimated laser index value, the laser index of the current child node, wherein the laser index of the current child node is constrained based on the determined quantity of lasers.

7. The device of claim 6, wherein to be constrained based on the determined quantity of lasers, the laser index of the current child node is constrained to be: greater than or equal to zero and less than or equal to the determined quantity of lasers minus one.

8. The device of claim 7, wherein to be constrained based on the determined quantity of lasers, the laser index of the current child node is clipped to be: greater than or equal to zero and less than or equal to the determined quantity of lasers minus one.

9. The device of claim 6, wherein the one or more processors are further configured to:
    decode, from a bitstream, a syntax element that represents the determined quantity of lasers.

10. The device of claim 6, wherein, to decode the laser index, the one or more processors are configured to decode the laser index responsive to determining that the current child node is encoded using an angular inferred direct coding mode (IDCM) of predictive geometry coding.

11. A non-transitory computer-readable storage medium storing instructions that, when executed, cause one or more processors of a point cloud decoding device to:
    determine a quantity of lasers used to capture light detection and ranging (LIDAR) data that represents the point cloud; and
    derive a laser index for a current child node of the point cloud, wherein the instructions that cause the one or more processors to derive the laser index comprise instructions that cause the one or more processors to:
        obtain an estimated laser index value of the current child node;
        obtain a residual laser index value for the current child node; and
        reconstruct, as a sum of the residual laser index value and the estimated laser index value, the laser index of the current child node, wherein the laser index of the current child node is constrained based on the determined quantity of lasers.

12. The non-transitory computer-readable storage medium of claim 11, wherein to be constrained based on the determined quantity of lasers, the laser index of the current child node is constrained to be: greater than or equal to zero and less than or equal to the determined quantity of lasers minus one.

13. The non-transitory computer-readable storage medium of claim 12, wherein to be constrained based on the determined quantity of lasers, the laser index of the current child node is clipped to be: greater than or equal to zero and less than or equal to the determined quantity of lasers minus one.

14. The non-transitory computer-readable storage medium of claim 11, further comprising instructions that cause the or more processors to:
    decode, from a bitstream, a syntax element that represents the determined quantity of lasers.

15. The non-transitory computer-readable storage medium of claim 11, wherein the instructions that cause the or more processors to derive the laser index comprise instructions that cause the or more processors to decode the laser index responsive to determining that the current child node is encoded using an angular inferred direct coding mode (IDCM) of predictive geometry coding.

* * * * *